(12) United States Patent
Lin et al.

(10) Patent No.: US 11,880,521 B2
(45) Date of Patent: Jan. 23, 2024

(54) ELECTRONIC DEVICE AND METHOD OF MANUFACTURING THE SAME

(71) Applicant: TPK Touch Solutions (Xiamen) Inc., Fujian (CN)

(72) Inventors: Ming-Chuan Lin, Taichung (TW); Sheh-Jung Lai, Taichung (TW); Kuo-Hsin Wang, Taichung (TW); Yu-Ling Chen, Taichung (TW)

(73) Assignee: TPK TOUCH SOLUTIONS (XIAMEN) INC., Fujian (CN)

( * ) Notice: Subject to any disclaimer, the term of this patent is extended or adjusted under 35 U.S.C. 154(b) by 0 days.

(21) Appl. No.: 17/404,000

(22) Filed: Aug. 17, 2021

(65) Prior Publication Data
US 2023/0056221 A1   Feb. 23, 2023

(51) Int. Cl.
*G02F 1/1368* (2006.01)
*G06F 3/041* (2006.01)
*G02F 1/1362* (2006.01)

(52) U.S. Cl.
CPC .......... *G06F 3/0412* (2013.01); *G02F 1/1368* (2013.01); *G02F 1/136209* (2013.01); *G02F 1/136222* (2021.01)

(58) Field of Classification Search
CPC ............. G06F 3/0412; G02F 1/136209; G02F 1/136222; G02F 1/1368
See application file for complete search history.

(56) References Cited

U.S. PATENT DOCUMENTS

| | | | | |
|---|---|---|---|---|
| 6,515,721 B2* | 2/2003 | Jin | ............... | G02F 1/133308 349/122 |
| 2014/0085556 A1* | 3/2014 | Yin | ............... | G02F 1/1362 349/43 |
| 2015/0009444 A1* | 1/2015 | Zhao | ............... | G02F 1/133514 349/43 |
| 2015/0160494 A1* | 6/2015 | Shin | ............... | G02F 1/133606 345/173 |
| 2020/0409499 A1* | 12/2020 | Ogura | ............... | G02F 1/13338 |
| 2021/0034182 A1* | 2/2021 | Zheng | ............... | G02F 1/13338 |
| 2021/0264864 A1* | 8/2021 | Yang | ............... | G09G 3/32 |

FOREIGN PATENT DOCUMENTS

| | | | |
|---|---|---|---|
| CN | 100378541 C | | 4/2008 |
| CN | 101581995 B | | 11/2009 |
| CN | 202865160 U | * | 4/2013 |
| CN | 104915055 A | * | 9/2015 |
| TW | 201545016 A | | 12/2015 |
| TW | M532598 U | | 11/2016 |

* cited by examiner

*Primary Examiner* — Temesghen Ghebretinsae
*Assistant Examiner* — Karin Kiyabu
(74) *Attorney, Agent, or Firm* — Cooper Legal Group, LLC (57) ABSTRACT

An electronic device includes an outer housing, a touch display module, and at least one optical assembly. The outer housing has an accommodating portion and an engaging portion. The touch display module is disposed in the accommodating portion and engaged with the engaging portion. The touch display module includes a thin-film transistor substrate, a color filter substrate, and a touch electrode layer. The color filter substrate is disposed on a side of the thin-film transistor substrate facing the outer housing. The touch electrode layer is disposed between the thin-film transistor substrate and the color filter substrate. The optical assembly is disposed on a side of the color filter substrate away from the thin-film transistor substrate.

5 Claims, 9 Drawing Sheets

ELECTRONIC DEVICE AND METHOD OF MANUFACTURING THE SAME

BACKGROUND

Technical Field

The present disclosure relates to an electronic device and a method of manufacturing the same.

Description of Related Art

Since a liquid crystal display (LCD) is a non-self-luminous display device, an external light source must be used to achieve the display effect. The function of a backlight module is to supply light with sufficient brightness and uniform distribution so that the LCD panel can display images normally.

According to the positions of the light sources in backlight modules, the backlight modules can be divided into direct-lit type and side-lit backlight type. The light source of a direct-lit backlight module is disposed under the liquid crystal panel. Light can enter directly or be indirectly reflected to the upper optical film. The light source of a side-lit backlight module is disposed on a side of the backlight module. After light enters the light guide plate from the side, the light is reflected to the upper optical film through the reflective plate.

However, a current touch display module using side-lit backlight modules has the following limitations: (1) multiple layers of optical adhesive are required for bonding, which increases the cost and difficulty of bonding operations; (2) due to limitations of the multilayer structure, the thickness of the backlight module is relatively thick; and (3) the backlight module needs to be fixed with a larger frame structure, which cannot achieve a narrow frame structure. China Patent No. CN100378541C discloses using a frame to buckle the display screen, and the design of the frame is not conducive to a narrow frame.

Although the prior art, China Patent No. CN101581995B, discloses a double-sided bonding technology, it does not teach how to overcome the cracks caused by the bonding of the thin substrate.

Accordingly, how to provide an electronic device to solve the aforementioned problems becomes an important issue to be solved by those in the industry.

SUMMARY

An aspect of the disclosure is to provide an electronic device and a method of manufacturing the same that can efficiently solve the aforementioned problems.

According to an embodiment of the disclosure, an electronic device includes an outer housing, a touch display module, and at least one optical assembly. The outer housing has an accommodating portion and an engaging portion. The touch display module is disposed in the accommodating portion and engaged with the engaging portion. The touch display module includes a thin-film transistor substrate, a color filter substrate, and a touch electrode layer. The color filter substrate is disposed on a side of the thin-film transistor substrate facing the outer housing. The touch electrode layer is disposed on a surface of one of the thin-film transistor substrate or the color filter substrate. The optical assembly is disposed on a side of the color filter substrate away from the thin-film transistor substrate.

In an embodiment of the disclosure, the thin-film transistor substrate has at least one extension portion extending outwardly relative to the color filter substrate. The extension portion is engaged with the engaging portion.

In an embodiment of the disclosure, the electronic device further includes a pressure-sensitive adhesive layer. The pressure-sensitive adhesive layer is disposed between and contacts the extension portion and the engaging portion.

In an embodiment of the disclosure, the touch display module further includes a polarizer. The polarizer is disposed on and contacts a side of the thin-film transistor substrate away from the outer housing.

In an embodiment of the disclosure, the polarizer constitutes a part of an appearance surface of the electronic device.

In an embodiment of the disclosure, the touch display module further includes a light-shielding layer. The light-shielding layer is disposed on the polarizer.

In an embodiment of the disclosure, the touch display module further includes a polarizer. The polarizer is disposed on the side of the color filter substrate away from the thin-film transistor substrate. The optical assembly is directly disposed on a side of the polarizer away from the color filter substrate.

In an embodiment of the disclosure, the optical assembly includes one or a combination of a brightness enhancement film, a diffusion film, and a reflection sheet.

In an embodiment of the disclosure, the optical assembly directly contacts an inner bottom surface of the accommodating portion.

In an embodiment of the disclosure, the electronic device further includes a backlight assembly. The backlight assembly is disposed in the accommodating portion and stacked with the optical assembly.

In an embodiment of the disclosure, the backlight assembly is a side-lit backlight assembly or a direct-lit backlight assembly.

In an embodiment of the disclosure, the direct-lit backlight assembly comprises miniature light emitting diodes (Mini-LEDs).

In an embodiment of the disclosure, the engaging portion is a step structure located on an inner side wall of the accommodating portion.

According to an embodiment of the disclosure, an electronic device includes an outer housing, a touch display module, a backlight assembly, a first pressure-sensitive adhesive layer, and a second pressure-sensitive adhesive layer. The outer housing has an accommodating portion. The touch display module is disposed in the accommodating portion and includes a thin-film transistor substrate, a color filter substrate, and a touch electrode layer. The color filter substrate is disposed on a side of the thin-film transistor substrate facing the outer housing. The touch electrode layer is disposed on a surface of the color filter substrate facing the thin-film transistor substrate or away from the thin-film transistor substrate. The backlight assembly is disposed in the accommodating portion and located between the outer housing and the touch display module. The first pressure-sensitive adhesive layer is disposed between and contacts the color filter substrate and the backlight assembly. The second pressure-sensitive adhesive layer is disposed between and contacts the backlight assembly and an inner bottom surface of the accommodating portion.

In an embodiment of the disclosure, the touch display module further includes a polarizer. The polarizer is disposed on and contacts a side of the thin-film transistor substrate away from the outer housing.

In an embodiment of the disclosure, the polarizer constitutes a part of an appearance surface of the electronic device.

In an embodiment of the disclosure, the touch display module further includes a light-shielding layer. The light-shielding layer is disposed on the polarizer.

According to an embodiment of the disclosure, a method of manufacturing an electronic device includes: stacking a thin-film transistor substrate with a color filter substrate; disposing a touch electrode layer on a surface of the color filter substrate or the thin-film transistor substrate; forming a light-shielding layer on a polarizer; stacking the polarizer on a side of the thin-film transistor substrate away from the color filter substrate; cutting the polarizer to align an edge of the polarizer with an edge of the thin-film transistor substrate, in which the thin-film transistor substrate, the color filter substrate, the polarizer, and the light-shielding layer constitute at least a part of a touch display module; and accommodating the touch display module in an accommodating portion of an outer housing, so as to make the polarizer constitute a part of an appearance surface of the electronic device.

Accordingly, in the electronic device of the present disclosure, the touch display module is assembled into the accommodating portion of the outer housing with the thin-film transistor substrate and the color filter substrate facing away from and facing the outer housing, respectively, and is fixed to the engaging portion of the outer housing with the extension portion at the edge of the thin-film transistor substrate. In other words, the electronic device of the present disclosure uses the thin-film transistor substrate as a fixed structure to replace the conventional glass cover, so the thickness of the electronic device can be reduced. In addition, the components of the backlight module are directly stacked in the accommodating portion of the outer housing, and the metal and plastic parts used in the conventional backlight module are omitted, so the thickness of the electronic device can also be reduced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
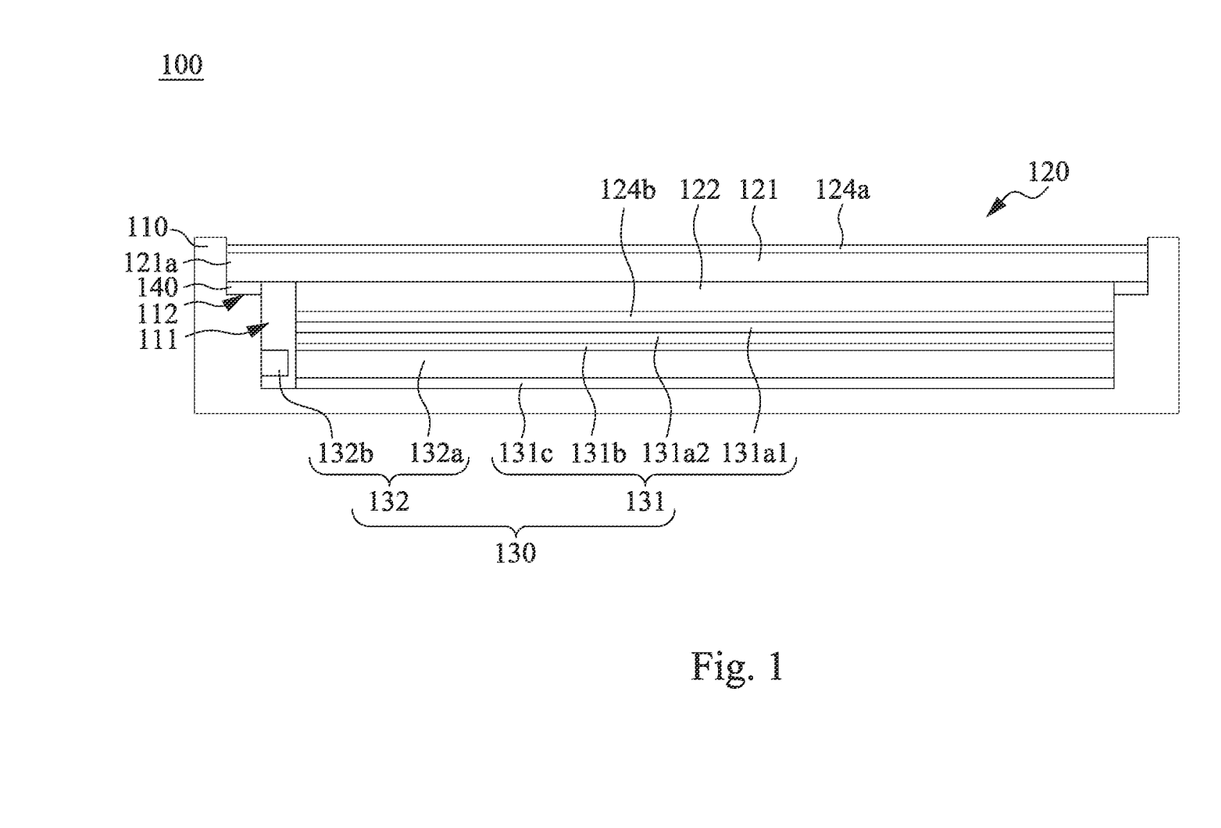
FIG. 1 is a schematic diagram of an electronic device according to an embodiment of the present disclosure.

Reference is made to FIG. 1. FIG. 1 is a schematic diagram of an electronic device 100 according to an embodiment of the present disclosure. As shown in FIG. 1, in the present embodiment, the electronic device 100 includes an outer housing 110, a touch display module 120, and a backlight module 130. The outer housing 110 has an accommodating portion 111 and an engaging portion 112. The touch display module 120 is disposed in the accommodating portion 111 and engaged with the engaging portion 112. The touch display module 120 includes a thin-film transistor substrate 121, a color filter substrate 122, and a touch electrode layer 123 (referring to FIGS. 4 and 5). The color filter substrate 122 is disposed on a side of the thin-film transistor substrate 121 facing the outer housing 110. The touch electrode layer 123 is disposed on a surface of one of the thin-film transistor substrate 121 or the color filter substrate 122. The backlight module 130 includes an optical assembly 131 and a backlight assembly 132. The optical assembly 131 and the backlight assembly 132 are stacked with each other in the accommodating portion 111.

Specifically, the thin-film transistor substrate 121 has extension portions 121a extending outwardly relative to the color filter substrate 122. The extension portions 121a are engaged with the engaging portion 112 of the outer housing 110. With the aforementioned structural configuration, the electronic device 100 of the present embodiment can use the thin-film transistor substrate 121 as a fixed structure to replace the conventional glass cover plate, so the thickness of the electronic device 100 can be reduced.

As shown in FIG. 1, in the present embodiment, the electronic device 100 further includes a pressure-sensitive adhesive layer 140. The pressure-sensitive adhesive layer 140 is disposed between and contacts the extension portions 121a of the thin-film transistor substrate 121 and the engaging portion 112 of the outer housing 110. The pressure-sensitive adhesive layer 140 has good adhesion characteristics and is suitable for reworking.

In some embodiments, the thin-film transistor substrate 121 has a plurality of the extension portions 121a, which respectively extend outward from edges of the thin-film transistor substrate 121 relative to the color filter substrate 122.

As shown in FIG. 1, in the present embodiment, the engaging portion 112 of the outer housing 110 is a step structure located on an inner side wall of the accommodating portion 111.

As shown in FIG. 1, in the present embodiment, the electronic device 100 further includes two polarizers 124a, 124b. The polarizer 124a is disposed on and contacts a side of the thin-film transistor substrate 121 away from the outer housing 110. The polarizer 124a constitutes a part of an appearance surface of the electronic device 100. The polarizer 124b is disposed on a side of the color filter substrate 122 away from the thin-film transistor substrate 121. The backlight module 130 is directly disposed on a side of the polarizer 124b away from the color filter substrate 122. It should be noted that the phrase "directly disposed" refers to adopting a disposing method that is not assisted by other components. Therefore, components of the backlight module 130 are directly stacked in the accommodating portion 111 of the outer housing 110, and the metal and plastic parts used in the conventional backlight module are omitted, so the thickness of the electronic device 100 can also be reduced.

In detail, the optical assembly 131 of the backlight module 130 includes brightness enhancement films 131a1, 131a2, a diffusion film 131b, and a reflection sheet 131c, in which the reflection sheet 131c directly contacts the inner bottom surface of the accommodating portion 111. The backlight assembly 132 of the backlight module 130 includes a light guide plate 132a and a light source 132b. The brightness enhancement films 131a1, 131a2, the diffusion film 131b, the light guide plate 132a, and the reflection sheet 131c are sequentially stacked in the accommodating portion 111 from top to bottom. The light emitted by the light source 132b enters the light guide plate 132a from the side surface of the light guide plate 132a, and the light can be reflected by the reflection sheet 131c and exit from the upper surface of the light guide plate 132a. The light leaving the light guide plate 132a can sequentially pass through the diffusion film 131b, the brightness enhancement films 131a2, 131a1, the polarizer 124b, the color filter substrate 122, the thin-film transistor substrate 121, and the polarizer 124a to leave the electronic device 100. The backlight assembly 132 of the present embodiment may be referred to as a side-lit type backlight assembly.

Figure 2:
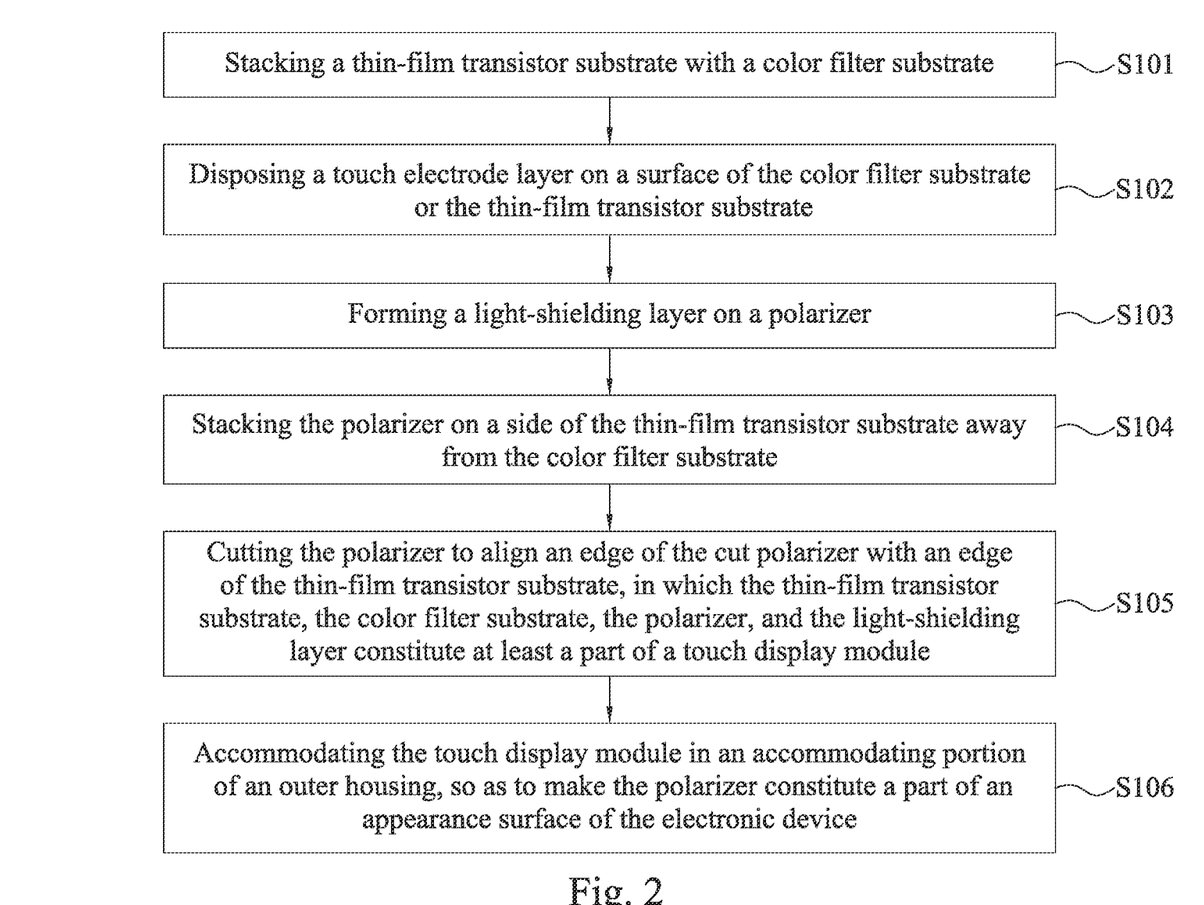
FIG. 2 is a flowchart of a method of manufacturing an electronic device according to an embodiment of the present disclosure.

Reference is made to FIG. 2. FIG. 2 is a flowchart of a method of manufacturing an electronic device according to an embodiment of the present disclosure. The method of the present embodiment includes steps S101 to S106, and reference may be made to FIG. 1 and FIG. 3 to FIG. 8. FIG. 3 and FIG. 6 to FIG. 8 are schematic diagrams respectively showing different manufacturing stages of the electronic device 100 in FIG. 1.

Figure 3:
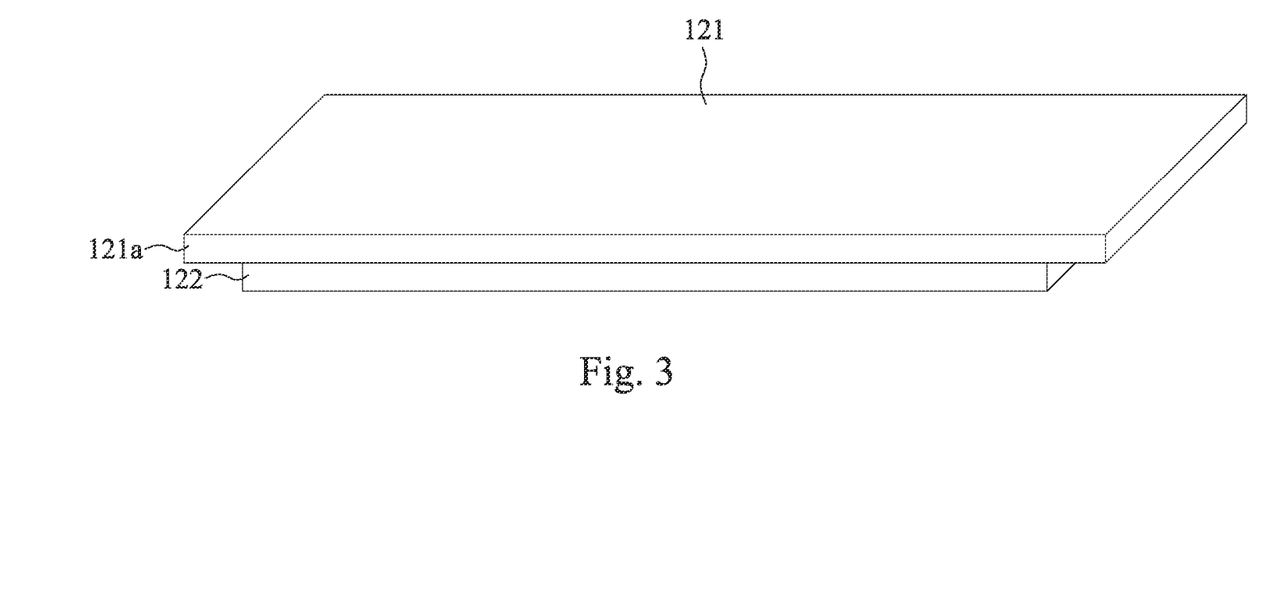
FIG. 3 is a schematic diagram showing a manufacturing stage of the electronic device in FIG. 1.

Step S101 (referring to FIG. 3): stacking a thin-film transistor substrate 121 with a color filter substrate 122. As shown in FIG. 3, the thin-film transistor substrate 121 has at least one extension portion 121a extending outwardly relative to the color filter substrate 122.

Figure 4:
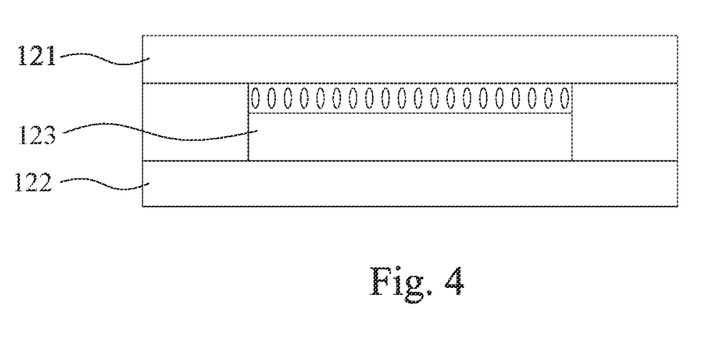
FIG. 4 is a schematic diagram of some elements of a touch display module according to an embodiment of the present disclosure.
Figure 5:
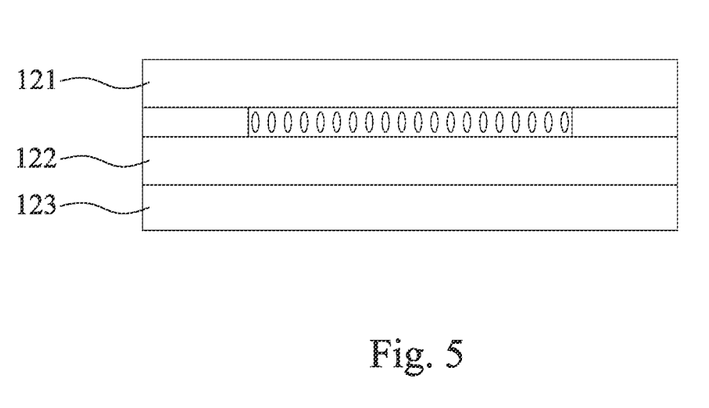
FIG. 5 is a schematic diagram of some elements of the touch display module according to another embodiment of the present disclosure.

Step S102: disposing a touch electrode layer 123 on a surface of the color filter substrate 122 or the thin-film transistor substrate 121. Reference is made to FIGS. 4 and 5. FIG. 4 is a schematic diagram of some elements of the touch display module 120 according to an embodiment of the present disclosure. FIG. 5 is a schematic diagram of some elements of the touch display module 120 according to another embodiment of the present disclosure.

In the embodiment shown in FIG. 4, the touch electrode layer 123 is disposed on a surface of the color filter substrate 122 facing the thin-film transistor substrate 121, and is located between the thin-film transistor substrate 121 and the color filter substrate 122 (i.e., the touch electrode layer 123 is embedded in the liquid crystal pixels). The structure shown in FIG. 4 may be referred to as an In-Cell touch display panel.

In the embodiment shown in FIG. 5, the touch electrode layer 123 is disposed on a surface of the color filter substrate 122 away from the thin-film transistor substrate 121 (i.e., the touch electrode layer 123 is embedded between the color filter substrate 122 and the polarizer 124b). The structure shown in FIG. 5 may be referred to as an On-Cell touch display panel. In some other embodiments, the touch electrode layer 123 may be disposed on a surface of the thin-film transistor substrate 121 away from the color filter substrate 122 (i.e., the touch electrode layer 123 is embedded between the thin-film transistor substrate 121 and the polarizer 124a).

Step S103 (referring to FIG. 6): forming a light-shielding layer 125 on a polarizer 124a.

Figure 6:
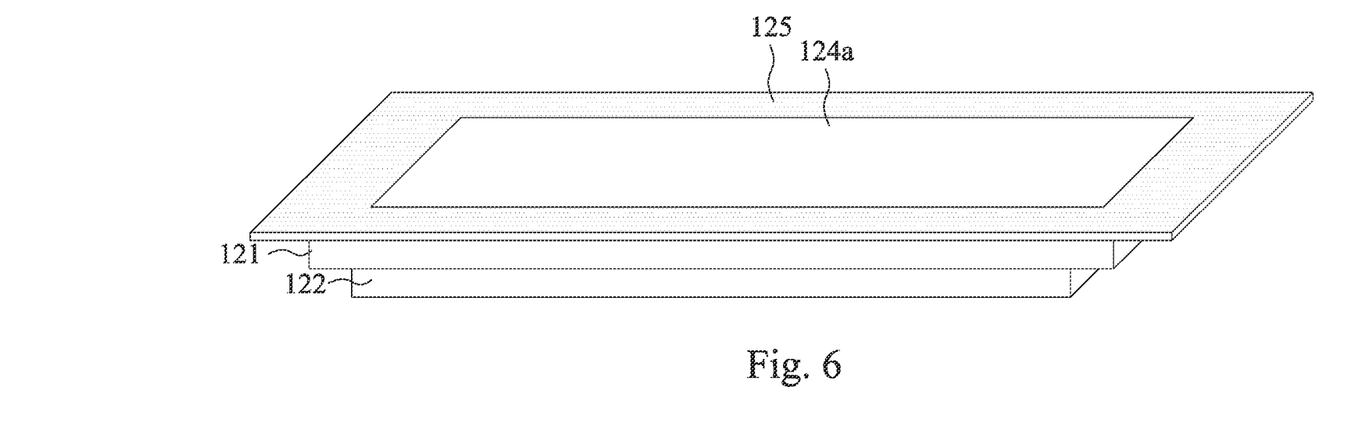
FIG. 6 is a schematic diagram showing a manufacturing stage of the electronic device in FIG. 1.

In some embodiments, the light-shielding layer 125 is printed on the polarizer 124a with black ink through, for example, a printing process, but the disclosure is not limited in this regard.

Step S104 (referring to FIG. 6): stacking the polarizer 124a on a side of the thin-film transistor substrate 121 away from the color filter substrate 122.

In some embodiments, the surface of the polarizer 124a away from the thin-film transistor substrate 121 is treated with an anti-scratch treatment.

Step S105 (referring to FIG. 7): cutting the polarizer 124a to align an edge of the cut polarizer 124a with an edge of the thin-film transistor substrate 121, in which the thin-film transistor substrate 121, the color filter substrate 122, the polarizer 124a, and the light-shielding layer 125 constitute at least a part of a touch display module 120. It should be noted that during the edge cutting process, the polarizer 124a and the thin-film transistor substrate 121 may have a cutting error of 0 mm to 0.1 mm. An extremely small cutting error also belongs to the scope defined by the aforementioned edge cutting.

Figure 7:
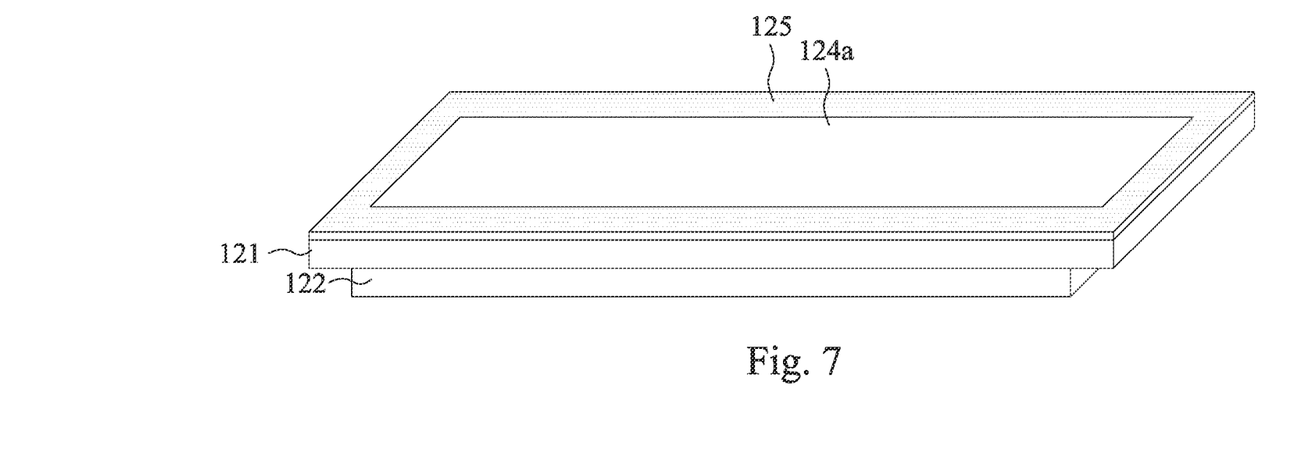
FIG. 7 is a schematic diagram showing a manufacturing stage of the electronic device in FIG. 1.

In some embodiments, the polarizer 124a is cut using a laser cutting technology, but the disclosure is not limited in this regard.

It should be noted that the method of manufacturing the electronic device 100 of the present embodiment first attaches the polarizer 124a to the thin-film transistor substrate 121 and then cuts off the part of the polarizer 124a that extends beyond the edge of the thin-film transistor substrate 121, so the alignment problem between the polarizer 124a and the thin-film transistor substrate 121 can be effectively solved, and the polarizer 124a can be fully attached to the thin-film transistor substrate 121 (i.e., there is no gap between the two).

Step S106 (referring to FIG. 8): accommodating the touch display module 120 in an accommodating portion 111 of an outer housing 110, so as to make the polarizer 124a constitute a part of an appearance surface of the electronic device 100.

Figure 8:
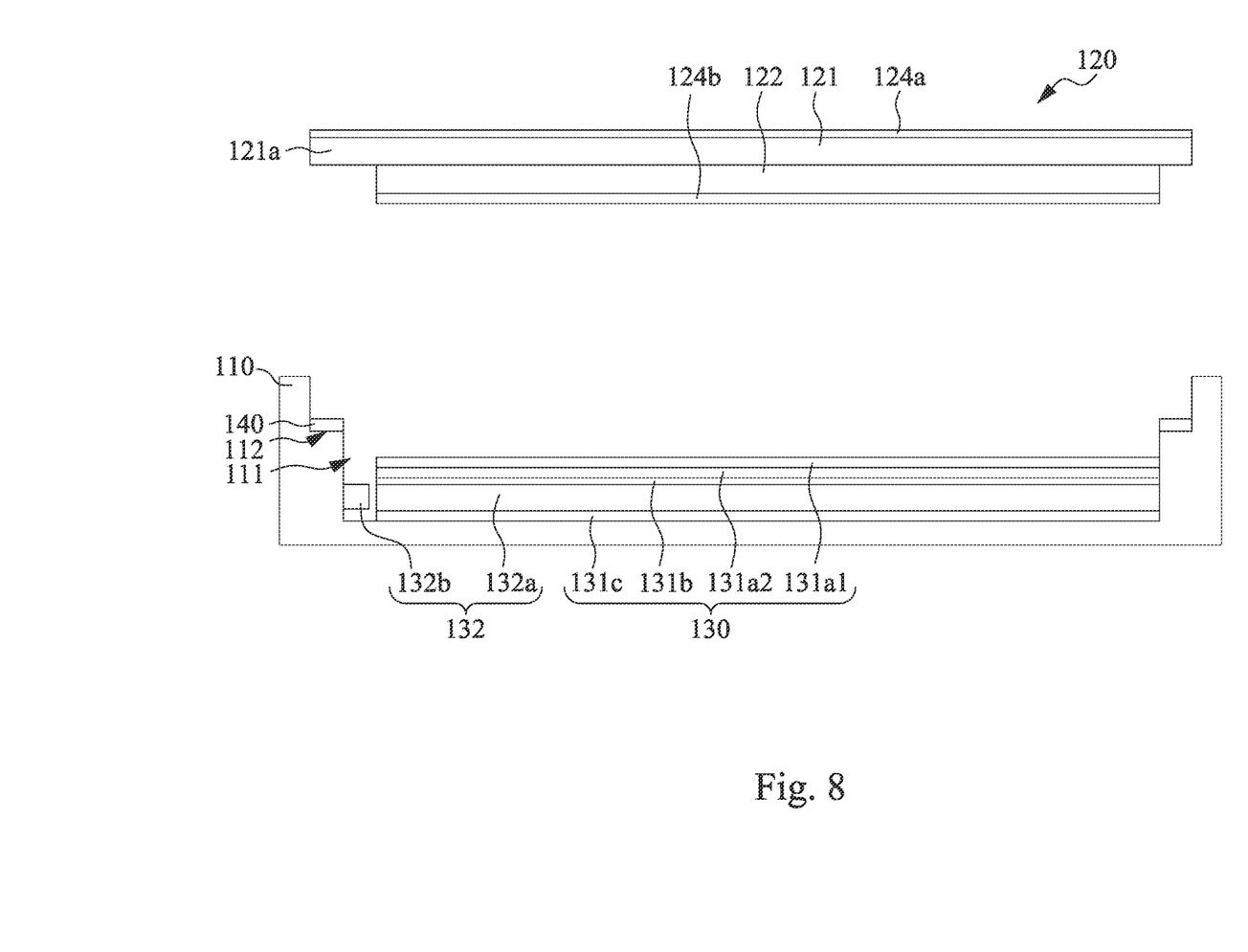
FIG. 8 is a schematic diagram showing a manufacturing stage of the electronic device in FIG. 1.

When step S106 is performed, the pressure-sensitive adhesive layer 140 may be first disposed on the engaging portion 112 of the outer housing 110, and the extension portions 121a of the thin-film transistor substrate 121 may be then pressed against the pressure-sensitive adhesive layer 140 to complete the manufacturing process of assembling the touch display module 120 to the outer housing 110.

In some embodiments, after step S105 and before step S106, the polarizer 124b may be stacked on a side of the color filter substrate 122 away from the thin-film transistor substrate 121.

In some embodiments, after step S105 and before step S106, the backlight module 130 may be directly disposed in the accommodating portion 111 of the outer housing 110.

After completing the above steps, the electronic device 100 shown in FIG. 1 can be obtained.

Figure 9:
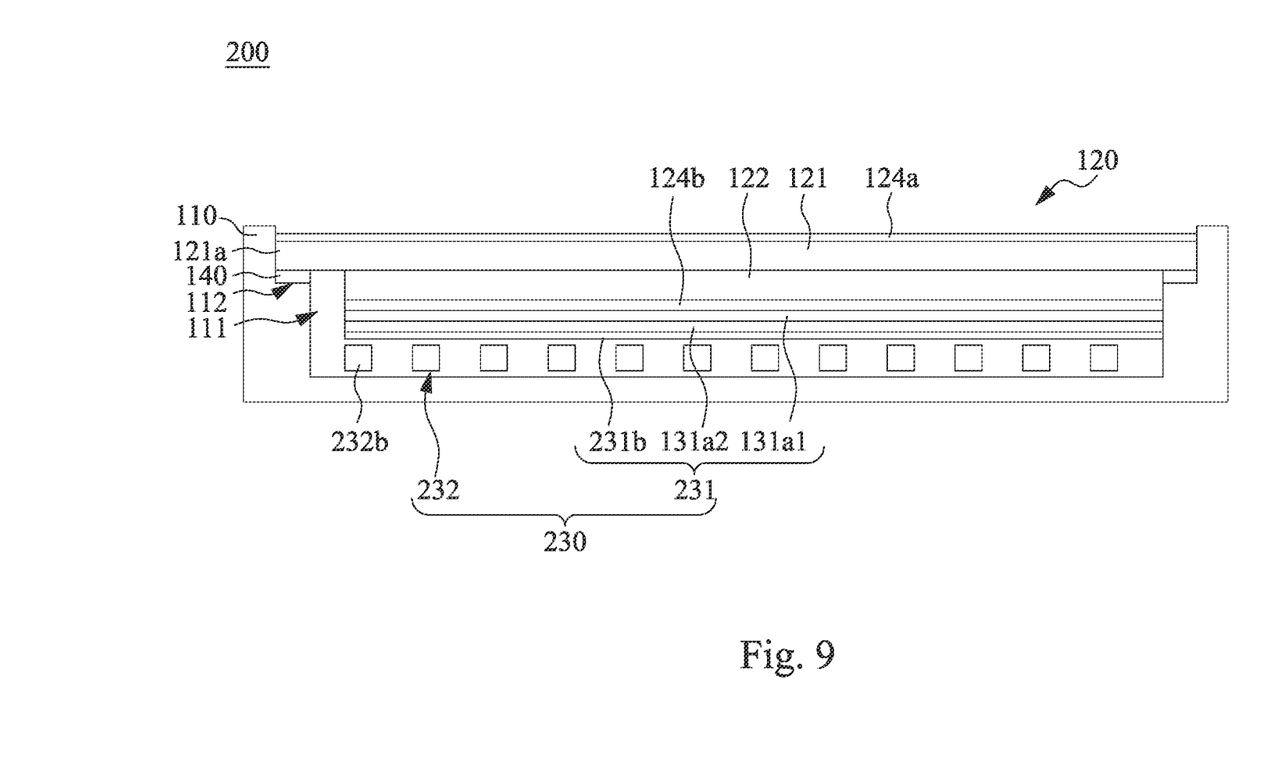
FIG. 9 is a schematic diagram of an electronic device according to another embodiment of the present disclosure.

Reference is made to FIG. 9. FIG. 9 is a schematic diagram of an electronic device 200 according to another embodiment of the present disclosure. As shown in FIG. 9, in the present embodiment, the electronic device 200 includes an outer housing 110, a touch display module 120, and a backlight module 230, in which the outer housing 110 and the touch display module 120 are the same or similar to the embodiment shown in FIG. 1, so reference to the previous paragraphs can be made for a relevant description of these components can and will not be repeated here. Compared with the embodiment shown in FIG. 1, the present embodiment provides the backlight module 230 that is modified. Specifically, in the present embodiment, the backlight module 230 includes an optical assembly 231 and a backlight assembly 232. The optical assembly 231 includes brightness enhancement films 131a1, 131a2 and an optical film 231b. The backlight assembly 232 includes a plurality of light sources 232b. The light sources 232b are uniformly disposed on the inner bottom surface of the accommodating portion 111. The brightness enhancement films 131a1, 131a2 and the optical film 231b of the optical assembly 231 are sequentially stacked on the backlight assembly 232 from top to bottom. The backlight assembly 232 of the present embodiment may be referred to as a direct-lit type backlight assembly.

In some embodiments, the light sources 232b are Mini-LEDs, but the present disclosure is not limited in this regard. In some embodiments, the size of the Mini-LEDs is between about 50 μm and about 200 μm.

Figure 10:
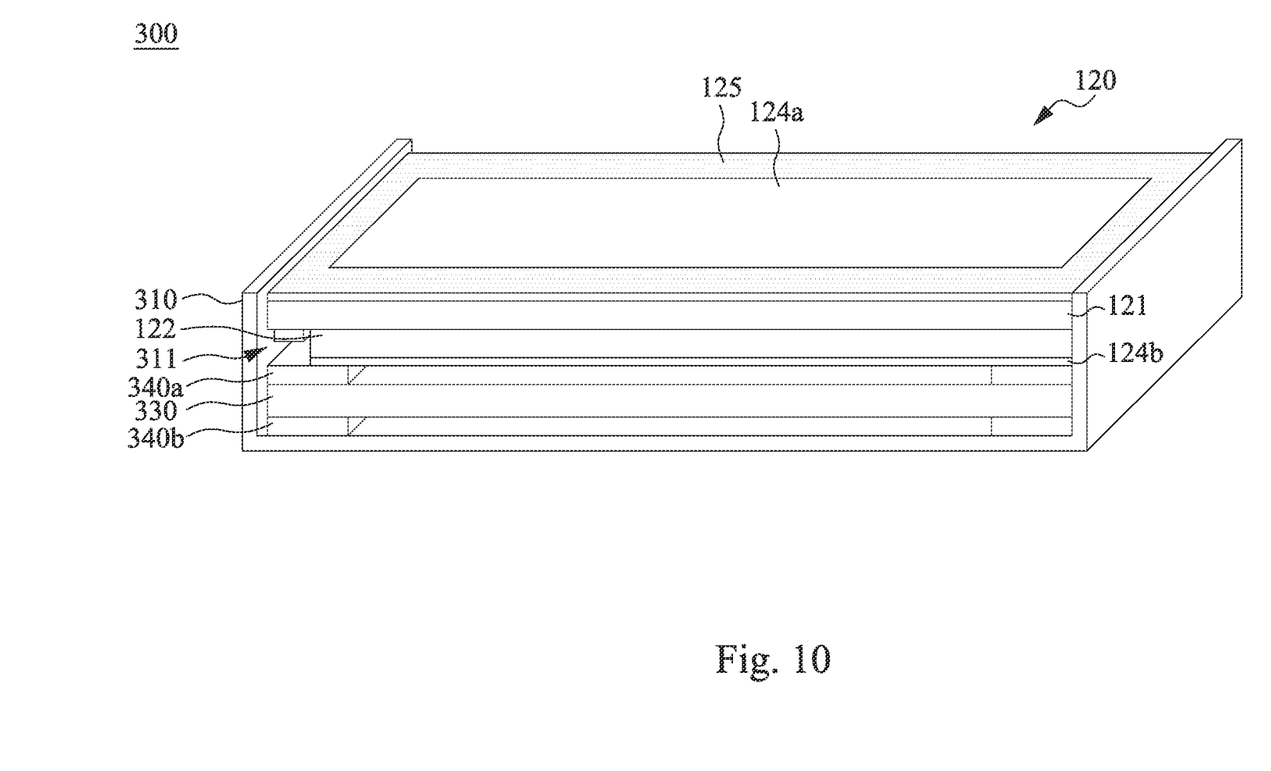
FIG. 10 is a schematic diagram of an electronic device according to another embodiment of the present disclosure.
Figure 11:
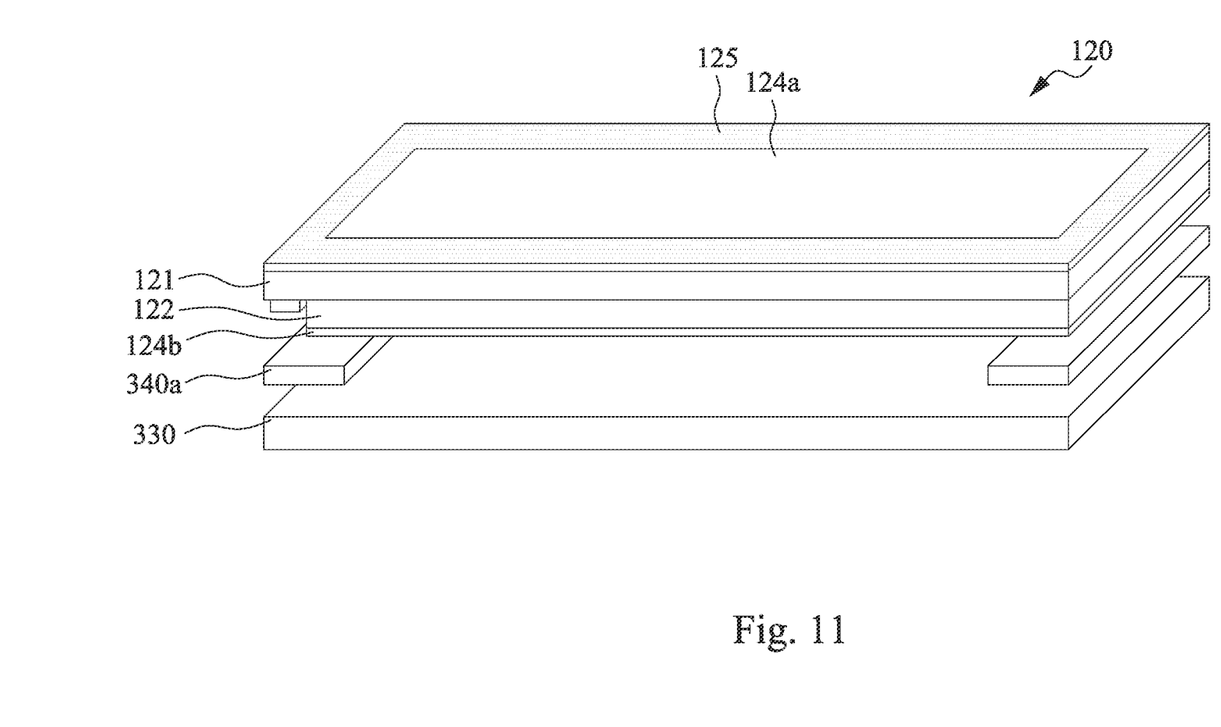
FIG. 11 is a schematic diagram showing a manufacturing stage of the electronic device in FIG. 11.

Reference is made to FIGS. 10 and 11. FIG. 10 is a schematic diagram of an electronic device 300 according to another embodiment of the present disclosure. FIG. 11 is a schematic diagram showing a manufacturing stage of the electronic device 300 in FIG. 11. As shown in FIGS. 10 and 11, in the present embodiment, the electronic device 300 includes an outer housing 310, a touch display module 120, and a backlight module 330. The touch display module 120 includes a thin-film transistor substrate 121, a color filter substrate 122, and a touch electrode layer 123. The color filter substrate 122 is disposed on a side of the thin-film transistor substrate 121 facing the outer housing 310. The touch electrode layer 123 is disposed on a surface of one of the thin-film transistor substrate 121 or the color filter substrate 122. The backlight module 330 is disposed on a side of the color filter substrate 122 away from the thin-film transistor substrate 121. The electronic device 300 further includes two polarizers 124a, 124b. The polarizer 124a is disposed on and contacts a side of the thin-film transistor substrate 121 away from the outer housing 110. The polarizer 124a constitutes a part of an appearance surface of the electronic device 100. The polarizer 124b is disposed on a side of the color filter substrate 122 away from the thin-film transistor substrate 121. The backlight module 330 is directly disposed on a side of the polarizer 124b away from the color filter substrate 122. It should be noted that the phrase "directly disposed" refers to adopting a disposing method that is not assisted by other components.

Compared with the embodiment shown in FIG. 1, the present embodiment provides the outer housing 310 and the backlight module 330 that are modified. Specifically, in the present embodiment, the outer housing 310 has an accommodating portion 311. The components of the backlight module 330 are directly stacked in the accommodating portion 311 of the outer housing 310, and the metal and plastic parts used in the conventional backlight module are omitted, so the thickness of the electronic device 300 can also be reduced. In addition, the electronic device 300 further includes a first pressure-sensitive adhesive layer 340a and a second pressure-sensitive adhesive layer 340b. The first pressure-sensitive adhesive layer 340a is disposed between and contacts the color filter substrate 122 and the backlight module 330. The second pressure-sensitive adhesive layer 340b is disposed between and contacts the backlight module 330 and the inner bottom surface of the accommodating portion 311. The first pressure-sensitive adhesive layer 340a and the second pressure-sensitive adhesive layer 340b have good adhesion characteristics and are suitable for reworking.

With the aforementioned structural configuration, the electronic device 300 of the present embodiment can replace the conventional glass cover plate with the thin-film transistor substrate 121, so that the thickness of the electronic device 300 can be reduced. Not only that, in the electronic device 300 of the present embodiment, the touch display module 120 and the backlight module 330 are sequentially and directly stacked on the inner bottom surface of the accommodating portion 311 from top to bottom, so that the electronic device 300 can achieve the purpose of extremely narrowing the frame thereof.

In addition, the electronic device 300 of the present embodiment shown in FIG. 10 can also be manufactured through steps S101 to S106 shown in FIG. 2. It should be noted that, in some embodiments, after step S105 and before step S106, the polarizer 124b may be stacked on a side of the color filter substrate 122 away from the thin-film transistor substrate 121.

In some embodiments (referring to FIG. 11), when step S106 is performed, the first pressure-sensitive adhesive layer 340a may be used to first attach the touch display module 120 and the backlight module 330, and the second pressure-sensitive adhesive layer 340b may be then used to attach the backlight module 330 to the inner bottom surface of the accommodating portion 311.

After completing the above steps, the electronic device 300 shown in FIG. 10 can be obtained.

According to the foregoing recitations of the embodiments of the disclosure, it can be seen that in the electronic device of the present disclosure, the touch display module is assembled into the accommodating portion of the outer housing with the thin-film transistor substrate and the color filter substrate facing away from and facing the outer housing, respectively, and the touch display module is fixed to the engaging portion of the outer housing with the extension portion at the edge of the thin-film transistor substrate. In other words, the electronic device of the present disclosure uses the thin-film transistor substrate as a fixed structure to replace the conventional glass cover, so the thickness of the electronic device can be reduced. In addition, the components of the backlight module are directly stacked in the accommodating portion of the outer housing, and the metal and plastic parts used in the conventional backlight module are omitted, so the thickness of the electronic device can also be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising:
    an outer housing having an accommodating portion;
    a touch display module disposed in the accommodating portion and comprising:
        a thin-film transistor substrate;
        a color filter substrate disposed on a side of the thin-film transistor substrate facing the outer housing; and
        a touch electrode layer disposed on a surface of the color filter substrate facing the thin-film transistor substrate or away from the thin-film transistor substrate;
    a backlight assembly disposed in the accommodating portion and located between the outer housing and the touch display module;
    a first pressure-sensitive adhesive layer disposed between and contacting the color filter substrate and the backlight assembly, wherein:
        a cavity is defined by the outer housing, a top surface of the first pressure-sensitive adhesive layer, and a sidewall of the color filter substrate, and
        the top surface of the first pressure-sensitive adhesive layer faces the thin-film transistor substrate; and
    a second pressure-sensitive adhesive layer disposed between and contacting the backlight assembly and an inner bottom surface of the accommodating portion.

2. The electronic device of claim 1, wherein the touch display module further comprises a polarizer, and the polarizer is disposed on and contacts a side of the thin-film transistor substrate away from the outer housing.

3. The electronic device of claim 2, wherein the polarizer constitutes a part of an appearance surface of the electronic device.

4. The electronic device of claim 2, wherein the touch display module further comprises a light-shielding layer disposed on the polarizer.

5. The electronic device of claim 1, wherein the touch display module further comprises a polarizer below the color filter substrate, and the cavity is further defined by a sidewall of the polarizer.

* * * * *